United States Patent
Chen et al.

(10) Patent No.: US 7,348,877 B2
(45) Date of Patent: Mar. 25, 2008

(54) PROMPTING SYSTEM FOR ON-VEHICLE WIRELESS COMMUNICATION MODULE OF CAR AFTER PARKING IN POOR COMMUNICATION QUALITY ENVIRONMENT AND METHOD THEREOF

(75) Inventors: Kuo-Rong Chen, Panchiao (TW); Chun-Chung Lee, Taipei (TW); Cheng-Hung Huang, Miaoli Hsien (TW)

(73) Assignee: Sin Etke Technology Co., Ltd., Taipei (TW)

( * ) Notice: Subject to any disclaimer, the term of this patent is extended or adjusted under 35 U.S.C. 154(b) by 258 days.

(21) Appl. No.: 11/341,602

(22) Filed: Jan. 30, 2006

(65) Prior Publication Data

US 2007/0018802 A1    Jan. 25, 2007

(30) Foreign Application Priority Data

Jul. 21, 2005    (TW) .............................. 94124669 A

(51) Int. Cl.
 *B60Q 1/00* (2006.01)
(52) U.S. Cl. ................... 340/438; 340/425.5; 340/500; 455/9; 455/456.1; 455/456.3
(58) Field of Classification Search ................ 340/438, 340/425.5, 500; 455/1, 10, 556.1
See application file for complete search history.

(56) References Cited

U.S. PATENT DOCUMENTS

| 6,922,147 B1* | 7/2005 | Viksnins et al. ......... 340/573.1 |
| 2005/0281213 A1* | 12/2005 | Dohn ......................... 370/310 |

* cited by examiner

*Primary Examiner*—Jeffery Hofsass
*Assistant Examiner*—Sisay Yacob
(74) *Attorney, Agent, or Firm*—Bacon & Thomas, PLLC

(57) ABSTRACT

A system for prompting an on-vehicle wireless communication module in poor communication quality and method thereof, in which the in-car computer starts a wireless communication module to detect the receiving quality thereof and to obtain a detecting signal result during the alert mode of the security controller is set after the ignition switch is switched off, and the in-car computer outputs a voice prompt message when the ignition switch is switched on again if the detecting signal result does not surpass a predetermined receiving quality default value. The in-car computer also stores each poor communication quality location in the electronic map so that a voice prompt message is automatically produced when passing each poor communication quality location on a subsequent occasion.

14 Claims, 2 Drawing Sheets

PROMPTING SYSTEM FOR ON-VEHICLE WIRELESS COMMUNICATION MODULE OF CAR AFTER PARKING IN POOR COMMUNICATION QUALITY ENVIRONMENT AND METHOD THEREOF

BACKGROUND OF THE INVENTION

1. Field of the Invention

The present invention relates to a vehicle security system and more particularly, to a prompting system for an on-vehicle wireless communication module of a car after parking in a poor communication quality environment and method thereof.

2. Description of Related Art

Currently, the vehicle security system of a car generally includes a security controller, a buzzer electrically connected to the security controller, and a plurality of sensors and sensor switches electrically connected to the security controller, respectively. After having left the car, the car owner can operate a remote controller to set the security controller to the alert mode, thereby starting the sensors and the sensor switches.

Further, a car may be provided with a wireless communication module such as a GSM (Global System for Mobile Communication) module. If one sensor or sensor switch is induced by an abnormal condition (for example, if one sensor detects a severe vibration of the car as the car is being towed away) after the car owner has left the car and set the security controller of the car to the alert mode, the respective sensor or sensor switch will provide a respective detection signal to the security controller, causing the security controller to drive the buzzer to output a warning sound and to simultaneously drive the headlights of the car to flash and/or send a message to a remote receiver, such as the call center or the car owner's cellular telephone, through the wireless communication module.

Since the base stations of different telecommunication corporations are distributed at respective locations, the communication quality for the wireless communication module may become poor in some particular areas, for example, the communication quality level (signal strength) may drop to level one or zero level in a remote mounting site or the basement of a building. The security system can not send a message to the remote receiver upon occurrence of an abnormal condition if the car is parked at a place where the wireless communication quality is poor. In this case, the car owner or the call center will be unable to receive the warning message from the security system of the car in real time.

SUMMARY OF THE INVENTION

The present invention has been accomplished under the circumstances in view. According to the present invention, the prompting system for an on-vehicle wireless communication module of a car after parking in a poor communication quality environment includes an ignition switch, a security controller settable between an alert mode and a non-alert mode, an in-car computer, which is electrically connected to the ignition switch and the security controller and has a receiving quality default value stored in a memory module thereof, and a wireless communication module electrically connected to the in-car computer. When the ignition switch is switched off and the security controller is set into the alert mode, the in-car computer starts the wireless communication module to detect the receiving quality for obtaining a detecting signal resultto which the in-car computer compares the receiving quality default value in the memory module; the in-car computer sets a prompt index and stores the prompt index in the memory module if the value of the detecting signal result does not surpass the receiving quality default value. When the ignition switch is switched on again, the in-car computer checks whether the prompt index in the memory module has been set or not and then provides a 'poor communication quality' prompt message if the prompt index has been set.

The memory module includes a register for storing the prompt index. The prompt index can be an electronic flag signal. The system further includes an audio device electrically connected to the in-car computer for output of the poor communication quality prompt message provided by the in-car computer when the in-car computer is checking the prompt index and the prompt index has been set.

The system further includes a display device electrically connected to the in-car computer for output of the poor communication quality prompt message provided by the in-car computer when the in-car computer is checking the prompt index and the prompt index has been set.

The system further includes a GPS (Global Positioning System) module electrically connected to the in-car computer for obtaining a global positioning data for enabling the in-car computer to compare the global positioning data to an electronic map stored in the memory module. When the value of the detecting signal result does not surpass the receiving quality default value, the in-car computer sets the global positioning data to be designated as a poor communication quality location, and stores the global positioning data of the poor communication quality location in the electronic map of the memory module, so that the in-car computer will output a voice prompt message through an audio device when passing through the poor communication quality location on a subsequent occasion. Further, if the value of the detecting signal result of the poor communication quality location surpasses the receiving quality default value when passing through on another subsequent occasion and the global positioning data of the poor communication quality location is stored in the electronic map, the in-car computer deletes the global positioning data of the poor communication quality location from the electronic map of the memory module.

The prompting method for an on-vehicle wireless communication module of a car after parking in a poor communication quality environment includes the steps of: (a) turning off an ignition switch and setting a security controller into an alert mode; (b) starting a wireless communication module so that the wireless communication module detects the receiving quality thereof for obtaining a detecting signal result; (c) temporarily storing the detecting signal result; (d) comparing the detecting signal result to a receiving quality default value so as to set a prompt index if the value of the detecting signal result does not surpass the receiving quality default value; and (e) turning on the ignition switch again and checking whether the prompt index has been set, and then enabling an audio device to output a poor communication quality prompt message if the prompt index has been set.

The power of the wireless communication module is turned off after the ignition switch is switched off and is turned on again when entering the step (b). The wireless communication module is started through an in-car computer.

The prompt index is an electronic flag signal; the value of the prompt index is 1 when the prompt index has been set; and the value of the prompt index is 0 when the prompt index has not been set.

When the value of the detecting signal result does not surpass the receiving quality default value, designating global positioning data obtained by a GPS (Global Positioning System) as a poor communication quality location, and then storing the global positioning data of the poor communication quality location in the electronic map, so that the audio device outputs the poor communication quality prompt message when passing through the poor communication quality location on a subsequent occasion. Further, if the value of the detecting signal result of the poor communication quality location surpasses the receiving quality default value when passing through on another subsequent occasion and the global positioning data of the poor communication quality location is stored in the electronic map, deleting the global positioning data of the poor communication quality location from the electronic map.

DETAILED DESCRIPTION OF THE PREFERRED EMBODIMENT

The present invention provides a prompt service for a car owner when the car is parked at a place where quality of telecommunication is poor. Namely, when the car owner has operated the remote controller to set the security system of the car into the alert mode after having parked the car and turned off the ignition switch, the in-car computer immediately starts the wireless communication module to detect the signal receiving quality. If the signal receiving quality is poor, the present invention provides a poor communication quality prompt message to inform the car owner after the car owner has turned on the ignition switch again, advising the car owner not to park the car in such a poor communication quality location again, thereby preventing an operation failure of the wireless communication module due to a poor communication quality.

Further, the present invention also provides a GPS module to obtain global positioning information, and an electronic map stored in a memory module. When the communication quality is poor, the present invention sets the poor communication place designation into the electronic map so that an indication can be provided to the car owner through an audio device or a display device when the car owner parks the car at such place or drives the car through such place on a subsequent occasion.

Figure 1:
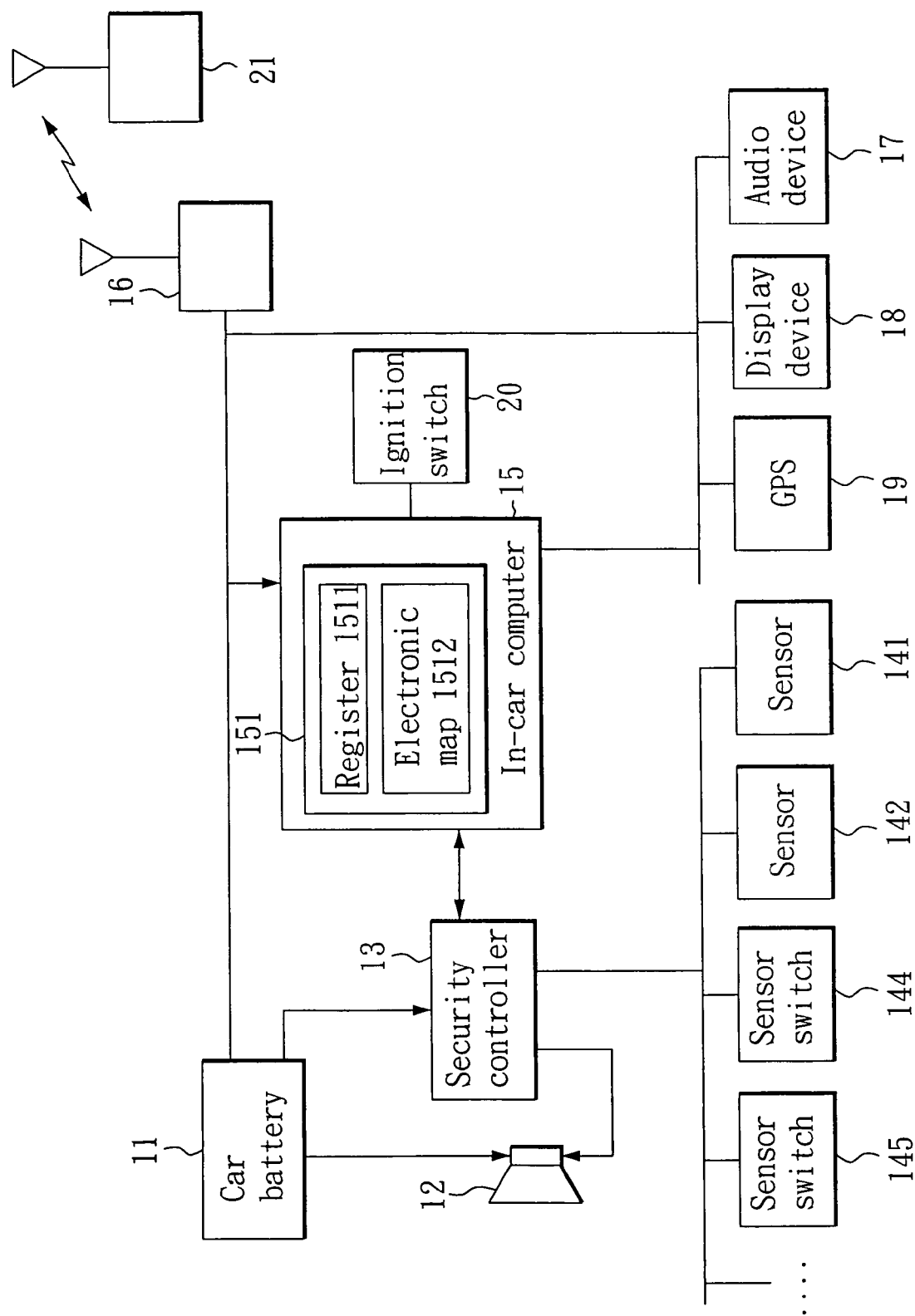
FIG. 1 is a system block diagram according to the preferred embodiment of the present invention.

FIG. 1 is a system block diagram according to the preferred embodiment of the present invention. As illustrated, the system includes a car battery 11, a buzzer 12, a security controller 13, sensors 141, 142, sensor switches 144, 145, an in-car computer 15, a wireless communication module 16, an audio device 17, a display device 18, a GPS (Global Positioning System) module 19, and an ignition switch 20. The in-car computer 15 includes a memory module 151 for storing a receiving quality default value and an electronic map 1512. The memory module 151 further includes a register 1511.

The car battery 11 is electrically connected to the buzzer 12, the security controller 13, the in-car computer 15, the wireless communication module 16, the audio device 17, the display device 18, and the GPS (Global Positioning System) module 19, respectively, thereby, providing the components with the necessary working voltage for normal working. When the ignition switch 20 is turned on, the car battery 11 provides the necessary working voltage to the components of the car and all other electric devices of the car such as the audio device and the electronic dashboard.

The security controller 13 is electrically connected to the buzzer 12, the in-car computer 15, the sensors 141, 142, and the sensor switches 144, 145, respectively. The in-car computer 15 is electrically connected to the wireless communication module 16, the audio device 17, the display device 18, the GPS module 19 and the ignition switch 20, respectively. The security controller 13 can alternatively be set between the alert (anti-theft) mode and the non-alert (non anti-theft) mode. Generally, the car owner operates the remote controller to set the security controller 13 to the alert mode after having left the car, thereby starting the sensors 141, 142 and the sensor switches 144, 145 to operate. On the contrary, the car owner operates the remote controller to disable the security controller 13 when wishing to use the car. When the security controller 13 is in the non-alert mode, the sensors 141, 142 and the sensor switches 144, 145 do not work.

If one of the sensors 141, 142 and sensor switches 144,145 is induced to output a detection signal to the security controller 13 during the alert mode of the security controller 13, the security controller 13 drives the buzzer 12 to produce a warning sound and the in-car computer 15 to send a warning message to the remote receiver 21 through the wireless communication module 16. In this preferred embodiment, the remote receiver 21 is the car owner's mobile phone. In another preferred embodiment of the present invention, the remote receiver 21 may be a call center. Of course, the wireless communication module 16 can send a warning message to multiple remote receivers 21 at the same time, for example, the wireless communication module 16 sends the warning message to the car owner's mobile phone and the call center at the same time.

Figure 2:
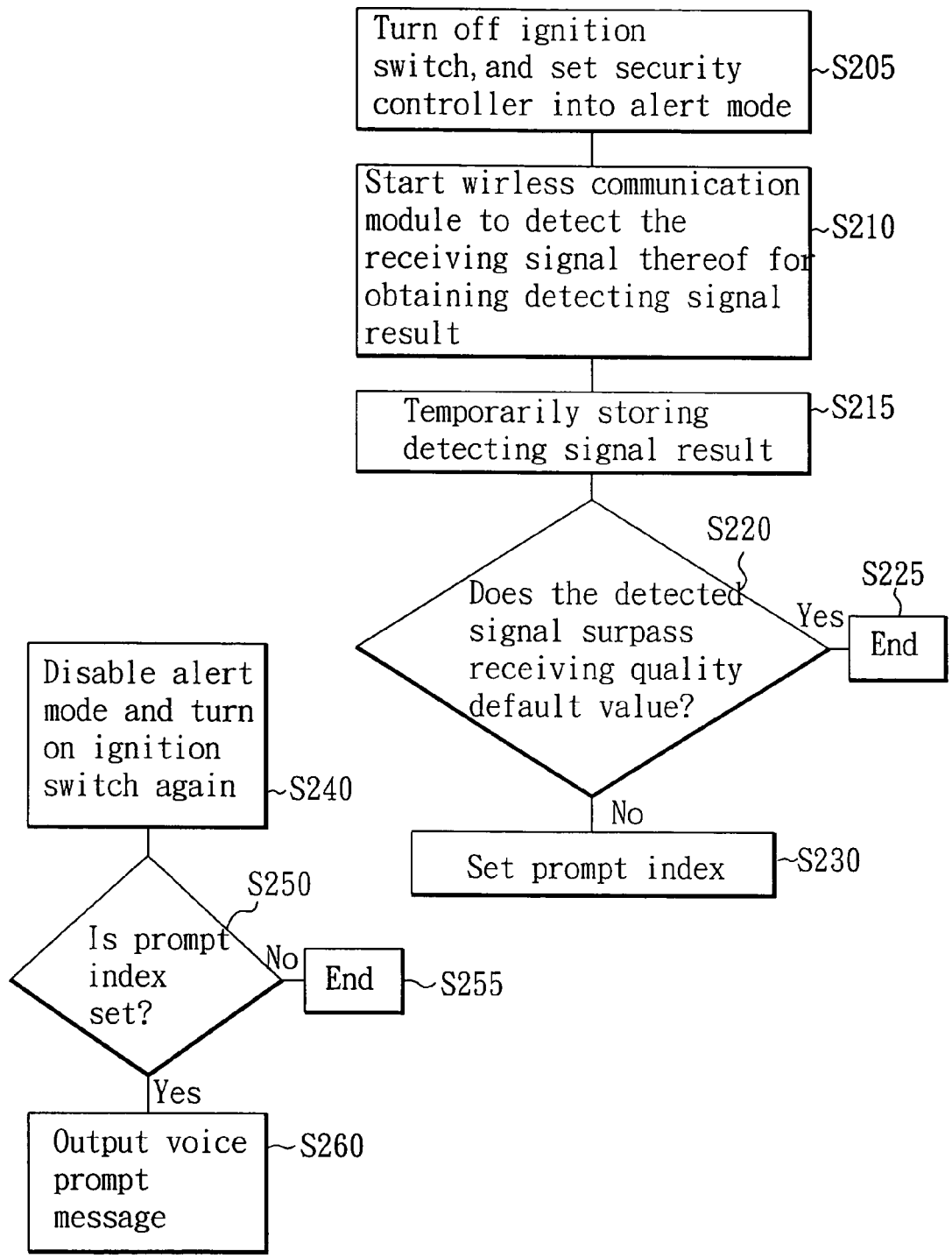
FIG. 2 is a flowchart according to the preferred embodiment of the present invention.

Next, referring to FIG. 2 and FIG. 1, wherein FIG. 2 is a flowchart according to the preferred embodiment of the present invention, after the car owner has parked the car and turned off the ignition switch 20 to turn off the engine, the car battery 11 is electrically disconnected from most electric devices of the car such as the audio device 17, the display device 18 and the GPS module 19 (Step 205). Further, it is to be understood that the ignition switch 20 is turned off at this time, and the wireless communication module 16 receives no power supply and does not work.

Thereafter, the car owner leaves the car and operates the remote controller to set the security controller 13 in the alert mode, thereby starting the security controller 13, the sensors 141, 142 and the sensor switches 144, 145. At the same time, the car battery 11 provides the necessary working voltage to the in-car computer 15 to make the in-car computer 15 work under a power-save mode. Immediately after the security controller 13 has entered the alert mode, the in-car computer 15 starts the wireless communication module 16, enabling the wireless communication module 16 to obtain the necessary working voltage from the car battery 11 and to start detecting the receiving quality (signal strength) around the area where the car is parked so as to obtain a detecting signal result (Step S210). Thereafter, the wireless communication module 16 sends the detecting signal result to the in-car computer 15 for storing in the memory module 15 temporarily (Step S215).

Thereafter, the in-car computer 15 compares the received detecting signal result to the receiving quality default value pre-stored in the memory module 151 to determine whether the value of the received detecting signal result is greater than the receiving quality default value or not (Step S220). For example, the receiving quality is classified to be level 6 for the strongest signal strength (the best receiving quality) or level 0 for the zero signal strength (the poorest receiving quality). Normally, if the receiving quality is below level 1, it is regarded as a poor communication quality. In this case, the wireless communication module 16 may be unable to communicate with the nearby base station. In this embodiment, the receiving quality default value is set to be level 1. If the value of the detecting signal result is equal to or below the receiving quality default value, the receiving quality at the place where the car is parked is very poor.

Therefore, if the value of the detecting signal result surpasses the receiving quality default value, the in-car computer 15 keeps working under the power-save mode (Step S225). If the value of the detecting signal result is equal to or below the receiving quality default value, the in-car computer 15 will change the prompt index (such as an electronic Flag signal) stored in the register 1511 from 0 to 1 (Step S230). Of course, if the value of the detecting signal result surpasses the receiving quality default value, the in-car computer 15 will not change the prompt index (Flag) and will keep the prompt index (Flag) at 0.

In another embodiment of the present invention, the register 1511 is configured in the in-car computer 15 outside the memory module 151. Further, the default value of the flag in the register 1511 can be 1, and the in-car computer 15 will change the value of the flag in the register 1511 from 1 to 0 when the value of the detecting signal result is equal or below the receiving quality default value. In another alternative form of the present invention, no flag is used to define the prompt index. The prompt index can be a numeric value stored in the memory module 151. Other measures may be employed to provide the prompt index.

Thereafter, when the car owner has returned to the place where the car is parked and operated the remote controller to disable the security controller 13 and to change the security controller 13 from the alert mode to the non-alert mode, and then turned on the ignition switch 20 to start the engine of the car, the car battery 11 provides the necessary working voltage to all electric devices in the car including the audio device 17 and the display device 18, for enabling the display device 18 to display all values on the dashboard and the GPS module 19 to start working (Step S240). At this time, the in-car computer 15 checks whether the prompt index in the register 1511 has been set or not (Step S250), and then the in-car computer 15 drives the audio device 17 to reproduce a voice prompt message stored in the memory module 151 (for example, the voice prompt message: "THE RECEIVING QUALITY AT THIS PLACE IS POOR. YOU MAY BE UNABLE TO RECEIVE A WARNING MESSAGE FROM THE WIRELESS COMMUNICATION MODULE UPON AN ABNORMAL STATUS OF THE CAR") if the prompt index has been set (Step S260). If the prompt index has not been set, end the procedure (Step S255). In addition to the voice prompt message outputted through the audio device 17, a letter prompt message may be simultaneously outputted through the display device 18.

Because the ignition switch 20 is turned on again, the GPS module 19 starts to work at this time. The GPS module 19 obtains the global positioning data of the car (for example, the longitude and latitude of the car) subject to signals from three satellites. Because the electronic map 1512 is stored in the memory module 151, the in-car computer 15 compares the global positioning data of the car to the electronic map 1512, thereby obtaining the current location of the car and showing the current location on the display device 18.

Because the value of the detecting signal result does not surpass the receiving quality default value, the in-car computer 15 sets the global positioning data to be a poor communication quality location and adds the data to the electronic map 1512 so that the in-car computer 15 will give a voice prompt message through the audio device 17 when the car owner drives the car through such a location or parks the car in such a location on a subsequent occasion. Please note that every poor communication quality location is based on the coordinate data of the global positioning data with a particular tolerance (about 15 meters allowed).

Since the car owner may forget the poor communication quality prompt message of the current parking place that is outputted through the audio device 17 or the display device 18 and may park the car in such a poor communication quality location again, the in-car computer 15 stores the data of every poor communication quality location in the electronic map 1512, so that the in-car computer 15 can output a prompt message through the audio device 17 or the display device 18 when the car owner drives the car through each poor communication quality location or parked the car in each poor communication quality location. Normally, a telecommunication company will regularly evaluate whether to add new base stations so as to provide a zero signal dead angle service. When the receiving quality has been changed from poor communication quality result to good communication result, the related poor communication quality location data should be eliminated from the electronic map 1512. That is, according to this embodiment, if the car owner parks the car in a poor communication quality location again, or passes through the poor communication quality location again, and the value of the detecting signal result obtained through the aforesaid procedure surpasses the receiving quality default value at this time, the in-car computer 15 deletes the global positioning data of the poor communication quality location from the electronic map 1512.

The on-vehicle wireless communication module poor communication quality prompt system of the present invention recognizes the place where the car is parked and the receiving quality (signal strength) of the wireless communication module of the security system of the car is poor, and will give a prompt message if the car owner parks the car in such a place again. When the car owner has operated the remote controller to set the security system of the car to the alert mode after having parked the car and turned off the ignition switch, the in-car computer immediately starts the wireless communication module of the security system to detect the signal receiving quality. If the value of the detecting signal result is equal or smaller than the receiving quality default value, it means there is a poor communication quality, and the on-vehicle wireless communication module poor communication quality prompt system will give a poor communication quality prompt message through an audio device after the car owner has turned on the ignition switch again, advising the car owner not to park the car in such poor communication quality location again, thereby preventing an operation failure of the wireless communication module due to a poor communication quality.

Although the present invention has been explained in relation to its preferred embodiments, it is to be understood that many other possible modifications and variations can be made without departing from the scope of the invention as hereinafter claimed.

What is claimed is:

1. A prompting system for an on-vehicle wireless communication module of a car after parking in a poor communication quality environment comprising:
   an ignition switch;
   a security controller settable between an alert mode and a non-alert mode;
   an in-car computer electrically connected to the ignition switch and the security controller, the in-car computer including a memory module, the memory module storing a receiving quality default value; and
   a wireless communication module electrically connected to the in-car computer;
   wherein when the ignition switch is switched off and the security controller is set into the alert mode, the in-car computer starts the wireless communication module to detect the receiving quality for obtaining a detecting signal result to which the in-car computer compares the receiving quality default value in the memory module; the in-car computer sets a prompt index and stores the prompt index in the memory module if the value of the detecting signal result does not surpass the receiving quality default value;
   wherein when the ignition switch is switched on again, the in-car computer checks whether the prompt index in the memory module has been set or not and then provides a poor communication quality prompt message if the prompt index has been set.

2. The prompting system as claimed in claim 1, wherein the memory module includes a register for storing the prompt index.

3. The prompting system as claimed in claim 1, wherein the prompt index is an electronic flag signal.

4. The prompting system as claimed in claim 1, further comprising an audio device electrically connected to the in-car computer for output of the poor communication quality prompt message provided by the in-car computer when the in-car computer is checking the prompt index and the prompt index has been set.

5. The prompting system as claimed in claim 1, further comprising a display device electrically connected to the in-car computer for output of the poor communication quality prompt message provided by the in-car computer when the in-car computer is checking the prompt index and the prompt index has been set.

6. The prompting system as claimed in claim 1, further comprising a GPS (Global Positioning System) module electrically connected to the in-car computer for obtaining global positioning data for enabling the in-car computer to compare the global positioning data to an electronic map stored in the memory module.

7. The prompting system as claimed in claim 6, wherein when the value of the detecting signal result does not surpass the receiving quality default value, the in-car computer sets the global positioning data to be designated as a poor communication quality location and stores the global positioning data of the poor communication quality location in the electronic map of the memory module, so that the in-car computer outputs a voice prompt message through an audio device when passing through the poor communication quality location on a subsequent occasion.

8. The prompting system as claimed in claim 7, wherein if the value of the detecting signal result of the poor communication quality location surpasses the receiving quality default value when passing through on another subsequent occasion and the global positioning data of the poor communication quality location is stored in the electronic map, the in-car computer deletes the global positioning data of the poor communication quality location from the electronic map of the memory module.

9. A prompting method for an on-vehicle wireless communication module of a car after parking in a poor communication quality environment comprising the steps of:
   (a) turning off an ignition switch and setting a security controller into an alert mode;
   (b) starting a wireless communication module so that the wireless communication module detects the receiving quality thereof for obtaining a detecting signal result;
   (c) temporarily storing the detecting signal result;
   (d) comparing the detecting signal result to a receiving quality default value so as to set a prompt index if the value of the detecting signal result does not surpass the receiving quality default value; and
   (e) turning on the ignition switch again and checking whether the prompt index has been set, and then enabling an audio device to output a poor communication quality prompt message if the prompt index has been set.

10. The prompting method as claimed in claim 9, wherein in the step (a), the power of the wireless communication module is turned off after the ignition switch is switched off and is switched on again when entering the step (b).

11. The prompting method as claimed in claim 9, wherein in the step (b), the wireless communication module is started through an in-car computer.

12. The prompting method as claimed in claim 9, wherein the prompt index is an electronic flag signal; the value of the prompt index is 1 when the prompt index has been set; the value of the prompt index is 0 when the prompt index has not been set.

13. The prompting method as claimed in claim 9, wherein the step (e) further comprising when the value of the detecting signal result does not surpass the receiving quality default value, designating global positioning data obtained by a GPS (Global Positioning System) as a poor communication quality location, and then storing the global positioning data of the poor communication quality location in an electronic map, so that the audio device outputs the poor communication quality prompt message when passing through the poor communication quality location on a subsequent occasion.

14. The prompting method as claimed in claim 13, wherein if the value of the detecting signal result of the poor communication quality location surpasses the receiving quality default value when passing through on another subsequent occasion and the global positioning data of the poor communication quality location is stored in the electronic map, deleting the global positioning data of the poor communication quality location from the electronic map.

* * * * *